(12) United States Patent
Gamble

(10) Patent No.: US 12,391,580 B2
(45) Date of Patent: *Aug. 19, 2025

(54) USE OF BASALT FOR ADSORBING TOXIC MATERIAL

(71) Applicant: Valerie Ann Gamble, Houston, TX (US)

(72) Inventor: Valerie Ann Gamble, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/675,855

(22) Filed: May 28, 2024

(65) Prior Publication Data

US 2024/0308879 A1    Sep. 19, 2024

Related U.S. Application Data

(63) Continuation of application No. 15/875,384, filed on Jan. 19, 2018, now Pat. No. 12,037,264.

(51) Int. Cl.
| | |
|---|---|
| *C02F 1/28* | (2023.01) |
| *B01J 20/04* | (2006.01) |
| *B01J 20/06* | (2006.01) |
| *B01J 20/10* | (2006.01) |
| *C02F 1/68* | (2023.01) |
| *C02F 11/00* | (2006.01) |
| *C02F 101/10* | (2006.01) |
| *C02F 101/36* | (2006.01) |
| *C02F 101/20* | (2006.01) |
| *C02F 101/22* | (2006.01) |

(52) U.S. Cl.
CPC ............ *C02F 1/281* (2013.01); *B01J 20/041* (2013.01); *B01J 20/06* (2013.01); *B01J 20/103* (2013.01); *C02F 1/68* (2013.01); *C02F 11/004* (2013.01); *C02F 2101/103* (2013.01); *C02F 2101/20* (2013.01); *C02F 2101/22* (2013.01); *C02F 2101/363* (2013.01); *C02F 2101/366* (2013.01)

(58) Field of Classification Search
CPC ........ B01J 20/041; B01J 20/06; B01J 20/103; C02F 1/281; C02F 1/68; C02F 11/004; C02F 2101/103; C02F 2101/20; C02F 2101/22; C02F 2101/363; C02F 2101/366
See application file for complete search history.

(56) References Cited

U.S. PATENT DOCUMENTS

| | | | | |
|---|---|---|---|---|
| 5,700,107 | A * | 12/1997 | Newton | ............... C04B 28/02 588/256 |
| 2011/0057346 | A1* | 3/2011 | Nunn | .................. D04H 1/4274 28/103 |
| 2013/0340613 | A1* | 12/2013 | Krupnikov | ............ B01D 39/18 264/413 |
| 2018/0134582 | A1 | 5/2018 | Awad et al. | |

OTHER PUBLICATIONS https//us-basalt.com/non-wovens, printed Apr. 29, 2020.
basaltfiberworld.blogspot.com/2011/05/fire-test-of-basalt-fiber-needle.html?m=1; printed Apr. 29, 2020.

* cited by examiner

*Primary Examiner* — Patrick Orme
(74) *Attorney, Agent, or Firm* — The Patent Agency; Gaurav Goel

(57) ABSTRACT

Basalt selectively adsorbs organic toxic materials, such as dioxins, furans, polychlorinated biphenyls (PCBs), bis(2-ethylhexyl)phthalate, arsenic, mercury, chromium, copper, nickel, zinc, cadmium, lead, and the like, from substances such as sediment, which contains water and the toxic materials.

28 Claims, No Drawings

USE OF BASALT FOR ADSORBING TOXIC MATERIAL

CROSS-REFERENCE TO RELATED APPLICATION

This application claims the benefit of U.S. patent application Ser. No. 15/875,384 filed Jan. 19, 2018, titled "Use of Basalt to Adsorb Toxic Material" and incorporated herein in its entirety by reference.

FIELD OF THE DISCLOSURE

The invention relates in one non-limiting embodiment to methods and compositions for removing toxic materials from substances such as water and sediments, and more particularly relates in another non-restrictive version to methods and compositions for selectively removing toxic materials from sediments and water using basalt.

DESCRIPTION OF THE RELATED ART

Chlorinated dibenzodioxins (CDDs) are a family of different compounds commonly referred to as polychlorinated dioxins. These compounds are generally considered toxic and have varying harmful effects. The CDD family is divided into eight groups of chemicals based on the number of chlorine atoms in the compound. The group with one chlorine atom is called the mono-chlorinated dioxin(s). The groups with two through eight chlorine atoms are called di-chlorinated dioxin (DCDD), tri-chlorinated dioxin (TrCDD), tetra-chlorinated dioxin (TCDD), penta-chlorinated dioxin (PeCDD), hexa-chlorinated dioxin (HxCDD), hepta-chlorinated dioxin (HpCDD), and octa-chlorinated dioxin (OCDD), respectively. The chlorine atoms can be attached to the dioxin molecule at any one of eight positions. The name of each CDD indicates both the number and the positions of the chlorine atoms. For instance, the CDD with four chlorine atoms at positions 2, 3, 7, and 8 on the dioxin molecule is called 2,3,7,8-tetrachlorodibenzo-p-dioxin or 2,3,7,8-TCDD:

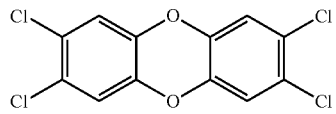 [SMILES: Clc1cc2c(cc1Cl)Oc1cc(Cl)c(Cl)cc1O2]

2,3,7,8-TCDD, which is sometimes just referred to as "dioxin", is one of the most toxic of the CDDs to mammals, and thus humans, and has received the most attention. Therefore, 2,3,7,8-TCDD serves as a prototype for CDDs as a group, and thus CDDs with toxic properties similar to 2,3,7,8-TCDD are called "dioxin-like" compounds. Chlorinated dibenzofurans (CDFs) are chemically related and can occur along with CDDs. Polychlorinated biphenyls (PCBs) are also chemically related.

In the pure form, CDDs are colorless solids or crystals. CDDs may enter the environment as mixtures containing a variety of individual components and impurities. In the environment they tend to be associated with ash, soil, or any surface with a high organic material content, such as plant leaves. In water and air, a portion of the CDDs may be found in the vapor or dissolved state, depending on the amount of particulate matter, temperature, and other environmental factors. CCDs have very low water solubility and tend to adsorb onto solid particles.

CDDs are known to occur naturally, and may also be produced by human activities. CDDs are naturally produced from the incomplete combustion of organic material by forest fires or volcanic activity. CDDs are not intentionally manufactured by industry, except in small amounts for research purposes. They are unintentionally produced by industrial, municipal, and domes-tic incineration and combustion processes. It is presently believed that COD emissions associated with human incineration and combustion activities are the predominant environmental source.

CDDs (mainly 2,3,7,8-TCDD) may be formed during the chlorine bleaching process used by pulp and paper mills. CDDs may also occur as a contaminant in the manufacturing process of certain chlorinated organic chemicals, such as chlorinated phenols, such as during the manufacture of 2,4,5-trichlorophenol (2,4,5-TCP). 2,4,5-TCP was used to produce hexachlorophene (used to kill bacteria) and the herbicide, 2,4,5-trichlorophenoxyacetic acid (2,4,5-T). In most industrialized countries the use of products contaminated with CDDs has been greatly reduced.

One place where dioxins/furans are present is in the San Jacinto River Waste Pits (SJRWP) Superfund Site near Houston, Texas. The dioxins/furans in the SJRWP are from paper mill waste. It is therefore highly desirable to have an effective method for removing dioxins/furans from waste and sediment such as that found in the SJRWP and other locations that contain similar materials.

SUMMARY

In one aspect, the invention is a method for removing toxic material from a substance, such as sediment, where the process including contacting a substance that comprises water and at least one toxic material with an effective amount of basalt for a period of time effective to remove at least a portion of the at least one toxic material from the sediment into the basalt, for instance by adsorption.

DETAILED DESCRIPTION

In one non-limiting embodiment, the method involves contacting a substance, e.g. sediment, that includes or comprises at least one toxic material with basalt in an effective or sufficient amount for an effective or sufficient amount of time for the basalt to adsorb or otherwise remove at least a portion of the at least one toxic material. In one non-restrictive version of the method, the substance being treated comprises water and the at least one toxic material.

Although the method is expected to be useful in removing toxic materials from many substances, in one particular, non-limiting embodiment, the method removes toxic materials from sediment. "Sediment" is defined as matter that settles to bottom of a liquid. Sediment is particulate and may include dirt, sand, silt, gravel, sludge, dregs, lees, precipitate, deposits, mud, muck, mire, ooze, alluvium, and the like. As defined herein, sediment is not limited by particle size, although any of the size ranges given below in Table I alone or in combination would be applicable.

TABLE I

Partial International Identification and Classification of Soils

| | Name | | | Size range (mm) | Size range (approx. in.) |
|---|---|---|---|---|---|
| Coarse soil | Sand | Coarse sand | CSa | 0.63-2.0 | 0.024803-0.078740 |
| | | Medium sand | MSa | 0.2-0.63 | 0.0078740-0.024803 |
| | | Fine sand | FSa | 0.063-0.2 | 0.0024803-0.0078740 |
| Fine soil | Silt | Coarse silt | CSi | 0.02-0.063 | 0.00078740-0.0024803 |
| | | Medium silt | MSi | 0.0063-0.02 | 0.00024803-0.00078740 |
| | | Fine silt | FSi | 0.002-0.0063 | 0.000078740-0.00024803 |
| | Clay | | Cl | : : : ,0.002 | : : : ,0.000078740 |

It will be appreciated that the methods discussed herein may be used to remove toxic materials from other substances besides sediments, especially particulate substances that comprise water or to which water may be added to facilitate processing using the methods described herein. Such substances include, but are not necessarily limited to, flowing particulates that are a by-product from a manufacturing process (whether or not the byproduct is intentionally made), polymer particles or powders, ground water, and the like.

The sediment treated with basalt typically contains water. In one non-limiting embodiment, the method involves the case where the water in the sediment contains at least one water-soluble material. Because dioxins/furans and related compounds have very low water solubility, they are adsorbed on the particles, e.g. soil, dirt, rock, etc. Contacting the sediment with basalt causes the basalt to preferentially or selective adsorb the dioxins/furans from the sediment, while the basalt does not appreciably adsorb the at least one water-soluble material. While the dioxins/furans have low solubility in water, in one non-limiting embodiment it is believed that the liquid water facilitates the transfer of the dioxins/furans from the sediment to the basalt.

"Basalt" is defined herein as a common extrusive igneous (volcanic) rock formed from the rapid cooling of basaltic lava exposed at or very near the surface of a planet or moon. Flood basalt describes the formation in a series of lava basalt flows. In an alternative, more detailed definition, basalt is an aphanitic (fine-grained) igneous rock with generally 45-55% silica ($SiO_2$) and less than 10% feldspathoid by volume, and where at least 65% of the rock is feldspar in the form of plagioclase. It is the most common volcanic rock type on Earth, being a key component of oceanic crust as well as the principal volcanic rock in many mid-oceanic islands, including Iceland, Reunion Island, and the islands of Hawaii. Basalt commonly features a very fine-grained or glassy matrix interspersed with visible mineral grains. The average density is 3.0 gm/cm$^3$.

Basalt is defined by its mineral content and texture. Physical descriptions without mineralogical context may be unreliable in some instances. Basalt is usually grey to black in color, but rapidly weathers to brown or rust-red due to oxidation of its mafic (iron-rich) minerals into hematite and other iron oxides and hydroxides. Although usually characterized as "dark", basaltic rocks exhibit a wide range of shading due to regional geochemical processes. Because of weathering or high concentrations of plagioclase, some basalts can be light-colored, superficially resembling andesite to untrained eyes. Basalt has a fine-grained mineral texture due to the molten rock cooling too quickly for large mineral crystals to grow. Basalt is often porphyritic, containing larger crystals (phenocrysts) formed prior to the extrusion that brought the magma to the surface, embedded in a finer-grained matrix. These phenocrysts often are of olivine or a calcium-rich plagioclase, which have the highest melting temperatures of the typical minerals that can crystallize from the melt.

Basalt can be fashioned or shaped into a wide variety of forms, including but not necessarily limited to, fibers, chopped fibers, roving, filaments, mats, strands, chopped strands, particles, pellets, textiles, fabrics, tape, yarn, mesh, wool and combinations thereof. Because the method described herein involves contacting the sediment with basalt, it is believed that basalt with relatively high surface area per volume will be more efficient at adsorbing the at least one toxic material than basalt with relatively low surface area per volume. Suitable forms of basalt are available from United States Basalt Corporation (US Basalt).

The basalt can contain a wide variety of physical forms. For instance, in the case of waste pits, such as SJRWP, the cap and/or liner for the pit may be made entirely or partially of basalt. It is expected that the basalt can beneficially be formed into filters, such as industrial filters, for sediment and other substances to be pumped or passed through.

In one non-limiting embodiment the at least one toxic material includes dioxins, furans, and/or polychlorinated biphenyls (PCBs). PCBs are chemically similar to certain dioxins such as OCDD. A partial list of dioxins and furans that may be removed from sediment by adsorption by basalt is given in Table II.

TABLE II

Dioxins and Furans

| Name | Abbreviation |
|---|---|
| 1,2-dioxin | — |
| 1,4-dioxin | — |
| 2,3,7,8-tetrachlorodibenzo-p-dioxin | TCDD |
| 1,2,3,7,8-pentachlorodibenzo-p-dioxin | PeCDD |
| 1,2,3,4,7,8-hexachlorodibenzo-p-dioxin | HxCDD |
| 1,2,3,6,7,8-hexachlorodibenzo-p-dioxin | HxCDD |
| 1,2,3,7,8,9-hexachlorodibenzo-p-dioxin | HxCDD |
| 1,2,3,4,6,7,8-heptachlorodibenzo-p-dioxin | HpCDD |
| octachlorodibenzo-p-dioxin | OCDD |
| Furan | — |
| 2,3,7,8-tetrachlorodibenzofuran | TCDF |
| 1,2,3,7,8-pentachlorodibenzofuran | PeCDF |
| 2,3,4,7,8-pentachlorodibenzofuran | PeCDF |
| 1,2,3,4,7,8-hexachlorodibenzofuran | HxCDF |
| 1,2,3,6,7,8-hexachlorodibenzofuran | HxCDF |
| 1,2,3,7,8,9-hexachlorodibenzofuran | HxCDF |
| 2,3,4,6,7,8-hexachlorodibenzofuran | HxCDF |
| 1,2,3,4,6,7,8-heptachlorodibenzofuran | HpCDF |
| 1,2,3,4,7,8,9-heptachlorodibenzofuran | HpCDF |
| octachlorodibenzofuran | OCDF |

It will be appreciated that sometimes in the specification and claims herein the term "dioxin" is used to mean all of the toxic materials discussed that are chemically related to PCBs and the like, including, but not necessarily limited to all of the dioxins, furans, CDDs, CDFs, and PCBs discussed herein; that is, "dioxin" is used as a shorthand term for brevity.

It will also be appreciated that PCBs include, but are not necessarily limited to, AROCLOR-1016 and AROCLOR-1260, as well as other AROCLOR PCBs, available from Monsanto, now Bayer.

The toxic material may also include, but is not necessarily limited to, chemical compounds having one or more phenyl groups, such as bis(2-ethyl-hexyl)phthalate.

Additionally, the toxic material may include one or more metal, including, but not necessarily limited to, arsenic, mercury, chromium, copper, nickel, zinc, cadmium, lead, and/or combinations thereof. As is well known, it will be appreciated that not all metals are equally toxic at the same dosage level, although many metals may be considered toxic at a high enough level.

In general terms, the effective amount of basalt to use in the method herein is any amount that will remove at least a portion of the at least one toxic material from the sediment onto or into the basalt. Although it is sometimes difficult to predict in advance an effective range for any particular sediment due to a number of variables including, but not necessarily limited to, the kind of sediment, the kind and form of basalt, the temperature of the method, the contact time, the types and amounts of dioxins/furans, and the like, in one non-limiting embodiment an effective amount of basalt to at least one toxic material ranges equal to or more than about 200:1 independently to about 1:3 on a weight : weight basis; alternatively equal to or more than about 100:1 independently to about 1:2; in a non-restrictive embodiment equal to or more than about 50:1 independently to about 1:1; all on a weight : weight basis. As used herein with respect to a range, the term "independently" means that any lower threshold may be combined with any upper threshold to give a suitable alternative range.

In another non-limiting embodiment the effective amount of time that the basalt is contacted with the sediment ranges from about 24 hours independently to about 7 days; alternatively from about 2 days independently to about 6 days; in another non-limiting embodiment from about 3 days independently to about 5 days; and in another non-restrictive version about 60 hours independently to about 84 hours. The contacting may be conducted by any suitable technique including, but not necessarily limited to, stirring, mixing, spraying, counter-current flow, co-current flow, extrusion, extraction, passing the components through a static mixer, combinations of these, and the like. In some non-restrictive versions, the time period may be open-ended, for instance if a basalt-containing cap and/or liner is used to encompass sediment in a waste pit. Such a cap and/or liner may be in place for many years.

The method as described herein is not limited to any particular temperature range or pressure range; nevertheless, further investigation may find that under certain circumstances the method may be optimized by conducting it at a particular temperature and/or pressure range.

It will be appreciated that a goal is to remove all of the toxic material from the sediment, but that as a practical matter, it may only be physically possible and/or economically prudent to remove somewhat less than 100 wt % of the toxic material. However, even in such cases the method will be considered successful because some toxic material has been removed. More particularly, in one non-limiting embodiment, at least 25 wt % of the toxic material is removed; alternatively at least 27 wt % is removed; in another non-limiting version at least 40 wt %, or at least 50 wt %, or at least 60 wt %, or at least 70 wt %, or at least 80 wt %, or at least 90 wt %; alternatively at least 95 wt %, and in a different non-limiting embodiment at least 99 wt %.

It will be appreciated that in one non-restrictive version the method described herein may be accomplished in the absence of lead slag mineral wool, where the lead slag mineral wool is or is not coated with an oil soluble-hydrophobic film. In a different non-limiting embodiment the method described herein may be practiced in the absence of rock flour.

In one non-limiting embodiment, the substance treated that contains at least one toxic material may contain other materials, such as certain other water-soluble materials, and the basalt may selectively remove the at least one toxic material from the substance while not appreciably removing the other water-soluble materials.

The following examples are provided to illustrate the invention. The examples are not intended to limit the scope of the invention and they should not be so interpreted. Amounts are in weight parts or weight percentages unless otherwise indicated.

EXAMPLES

Example 1—Clean Water and Sand

The method concept was proven using clean water and blank sand spiked with a Laboratory Control Spike (LCS) of toxic material. The procedure was as follows.
1. First a solid basalt fiber sample was soaked in a 10% NaOH (~2N) solution for 30 minutes, and rinsed thoroughly with DI water to remove excess sodium hydroxide and dried.
2. 60 grams of blank sand was spiked with 2 ml LCS/ matrix spike pre-pared at standard concentration using acetone. The mixture was homogenized well, and then evaporated under a hood for 1-2 hours.
3. The sand was placed in the bottom of a 2 liter beaker.
4. A piece of the basalt fiber was cut a little smaller than the beaker circumference using well-cleaned scissors. The size of the basalt fiber piece was measured and recorded. The piece was placed on top of the sand.
5. One liter of DI water was added on top of sand and basalt filter in beaker. The top was covered with foil.
6. The beaker was gently agitated on a shaker on low speed over a week-end. The speed was low to avoid the beaker coming out of the shaker.
7. The basalt filter was propped over the beaker with a clean apparatus so the water retained in the filter was allowed to drip down back into the beaker.
8. The basalt filter was dried out under a hood on clean foil to avoid contamination. It was allowed to dry.
9. The water was decanted from the container. The volume of the decanted water was measured and recorded on a benchsheet.
10. The water sample was extracted for dioxins/furans according to Method 1613B. It was treated as a regular sample. Batch alone with MB (Method Blank), LCS, and DLCS (Duplicate Laboratory Control Spike). Labeled standard was used.
11. The dried basalt fiber sample that soaked was extracted on a soxhlet in toluene according to the method SOP protocol for 1613B. This was batched along with the sand sample. MB, LCS and DLCS were used. They were spiked just like a normal batch.

12. 30 grams wet weight of the sand were extracted from the bottom of the container. Total solids test was run as well. They were put in the same batch with the filter.
13. Three sets of results were reported for testing of the water, the basalt fiber sample portion that soaked in the spiked sand/water, and 30 grams of the sand from the bottom of the beaker.

The results of Example 1 are presented in Table III. In one instance, for OCDD, the amount recovered was 55%, which was calculated by dividing the total recovered of 21905 picograms (pg) by the total spiked (40000 pg)×100. Thus, the average total recovered was 63%. In Table III, note that the abbreviation "Rec" refers to "recovered".

10. The water sample was extracted for dioxins/furans according to Method 1613B. It was treated as a regular sample. Batch alone with MB, LCS, and DLCS. Labeled standard was used.
11. The dried basalt fiber sample that soaked was extracted on a soxhlet in toluene according to the method SOP protocol for 1613B. This was batched along with the sand sample. MB, LCS and DLCS were used. They were spiked just like a normal batch along with the sediment sample.
12. 30 grams wet weight of the sediment sample were extracted from the bottom of the container. Total solids test was run as well. They were put in the same batch

TABLE III

Comparison Chart - Clean Water and Sand

| Contaminant | Water Sample (pg) | Water Rec (%) | Basalt Fiber (pg) | Basalt (total recovered) (%) | Sand (pg) | Sand Rec (%) | Total (pg) | Spike Amt (pg) | Total Recovered (%) | Basalt (initial spike) (%) |
|---|---|---|---|---|---|---|---|---|---|---|
| TCDD | 484 | 19 | 1694 | 65 | 412 | 16 | 2589 | 4000 | 65 | 42 |
| PeCDD | 2827 | 22 | 7544 | 58 | 2544 | 20 | 12914 | 20000 | 65 | 38 |
| HxCDD | 2896 | 23 | 7094 | 55 | 2837 | 22 | 12827 | 20000 | 64 | 35 |
| HxCDD | 2863 | 23 | 6975 | 55 | 2851 | 22 | 12688 | 20000 | 63 | 35 |
| HxCDD | 2901 | 24 | 6512 | 53 | 2841 | 23 | 12254 | 20000 | 61 | 33 |
| HpCDD | 2412 | 21 | 6224 | 53 | 3099 | 26 | 11735 | 20000 | 59 | 31 |
| OCDD | 3607 | 16 | 11287 | 52 | 7011 | 32 | 21905 | 40000 | 55 | 28 |
| TCDF | 563 | 20 | 1845 | 66 | 409 | 15 | 2816 | 4000 | 70 | 46 |
| PeCDF | 2594 | 21 | 7213 | 59 | 2519 | 20 | 12326 | 20000 | 62 | 36 |
| PeCDF | 3106 | 23 | 7751 | 58 | 2575 | 19 | 13432 | 20000 | 67 | 39 |
| HxCDF | 2760 | 21 | 7175 | 56 | 2979 | 23 | 12915 | 20000 | 65 | 36 |
| HxCDF | 2625 | 21 | 6744 | 55 | 2875 | 23 | 12244 | 20000 | 61 | 34 |
| HxCDF | 2659 | 21 | 6710 | 54 | 3059 | 25 | 12428 | 20000 | 62 | 34 |
| HxCDF | 3024 | 23 | 7147 | 54 | 2979 | 23 | 13150 | 20000 | 66 | 36 |
| HpCDF | 2355 | 19 | 6614 | 54 | 3359 | 27 | 12328 | 20000 | 62 | 33 |
| HpCDF | 2514 | 21 | 6283 | 53 | 3098 | 26 | 11895 | 20000 | 59 | 31 |
| OCDF | 3923 | 15 | 14378 | 54 | 8571 | 32 | 26872 | 40000 | 67 | 36 |
| Average | 2595 | 17 | 7011 | 56 | 3177 | 24 | 12783 | 20471 | 63 | 35 |

Example 2—SJWP (San Jacinto Waste Pits) Sample

The procedure for testing similarly to Example 1 using a SJWP sample was as follows.
1. First a solid basalt fiber sample was soaked in a 10% NaOH (~2N) solution for 30 minutes, and rinsed thoroughly with DI water to remove excess sodium hydroxide and dried.
2. 60 grams of native SJWP sediment known to contain dioxins/furans was measured. The mixture was homogenized well.
3. The sand was placed in the bottom of a 2 liter beaker.
4. A piece of the basalt fiber was cut a little smaller than the beaker circumference using well-cleaned scissors. The size of the basalt fiber piece was measured and recorded. The piece was placed on top of the sand.
5. One liter of DI water was added on top of the sediment sample and basalt filter in beaker. The top was covered with foil.
6. The beaker was gently agitated on a shaker on low speed over a weekend. The speed was low to avoid the beaker coming out of the shaker.
7. The basalt filter was propped over the beaker with a clean apparatus so the water retained in the filter was allowed to drip down back into the beaker.
8. The basalt filter was dried out under a hood on clean foil to avoid contamination. It was allowed to dry.
9. The water was decanted from the container. The volume of the decanted water was measured and recorded on a benchsheet.

with the filter. This was batched along with another aliquot of 30 grams of the sediment sample prior to experiment for comparison.
13. Three sets of results were reported for testing of the water, the basalt fiber sample portion that soaked in the sediment/water, and 30 grams of the sand from the bottom of the beaker. The sediment sample prior to experiment results was also reported.

The results are compared to the original sediment sample, which was analyzed separately to estimate the level of dioxins/furans in the sediment sample prior to exposure in water to the basalt fiber sample. Results are compared in Table IV which reflects all results reported in picograms, unadjusted for sample size since that changes the reporting units to concentrations and the units will differ between solid and liquid matrices.

The total percent recovery value is 200% since 60 grams of sediment was used in the experiment compared to 30 grams of sediment used for the analysis of the sediment prior to experimentation. Therefore total dioxins/furans concentrations present in the sediment, filter and water from the experiment should be approximately double that found in the original sediment analyzed prior to experimentation. Using OCDD for comparison, it may be noticed that the percent recovery is almost exactly 200% at 203%. The sum of the picograms recovered for the water, basalt fiber and sediment sample is 67,333.897 picograms which is approximately double what was recovered in the sediment sample prior to experimentation at 33,157.346. This is what was expected since double the sediment was used in the experiment sample at 60 grams compared to 30 grams of sediment sample used prior to experimentation.

If only considering the total sum of 67,333.897 picograms recovered of OCDD from the experiment from all three matrices, the percent of OCDD in the sediment, water and basalt fiber is revealed as follows: 21% in the water from the experiment, 27% in the basalt fiber from the experiment and 51% recovered from the sediment leftover in the bottom of the container post experiment.

It may be noted that although 60 grams of sediment was used in the experiment, only 30 grams was found in the bottom of the container after the experiment was finished and the water was decanted out of the container. This was due to half of the particulates from the sediment distributed as either suspended in the water or trapped in the pores of the basalt sample. It was not possible from the steps taken in Example 2 to determine how much of the sediment is suspended in the aqueous portion and how much is trapped in the basalt filter. It is also inconclusive whether or not the basalt fiber is adsorbing dioxins/furans (removing dioxins/furans from the sediment) or if the recoveries detected in the basalt fiber are due to sediment particles trapped in the filter which are contaminated with dioxins/furans.

Therefore this test was inconclusive regarding the adsorption of dioxins/furans by the basalt fiber from an actual sediment sample known to contain dioxins/furans because the sediment samples may have been old. Thus, further investigation is necessary. Nevertheless, it appears that the basalt filter adsorbed at least 27% of the dioxins/furans.

sample was thoroughly rinsed in deionized (DI) water to remove any the excess sodium hydroxide. The sample then dried overnight in a 105° C. forced air drying oven. This sample was considered the baseline.

Three subsamples were then digested in concentrated nitric acid in a 95° C. hot block for 2 hours. Due to the nature of the material, the sample did not completely digest and this analysis is considered a leaching procedure. The resulting leachate was diluted and analyzed in comparison with known ICP-MS standards. Table V gives the results for the analysis of the baseline basalt sample. The initial material contains lead (Pb) and copper (Cu) in low amounts. LOO refers to limit of quantification.

TABLE V

Results for the Analysis of the Baseline Basalt Sample

| Parameter | Result (µg/kg) | Limit of Quantitation (µg/kg) |
|---|---|---|
| Arsenic (As) | <LOO | 0.38 |
| Copper (Cu) | 14.05 | 0.38 |
| Mercury (Hg) | <LOO | 0.15 |
| Lead (Pb) | 1.78 | 0.38 |

Sample Preparation Step 2:

Two subsamples of the previously prepared sample were weighed to approximately 1 gram. A known solution of 10 µg/kg of each As, Cu, Pb and 5 µg/kg Hg was prepared and

TABLE IV

SJWP Sample

| | Water (pg) | Basalt Fiber (pg) | Sediment (pg) | Total (Water + Fiber + Sediment) (pg) | Sediment Sample (prior to Experiment) (pg) | % recovered* |
|---|---|---|---|---|---|---|
| TCDD | 22.709 | 105.131 | 263.218 | 391.058 | 119.992 | 326% |
| PeCDD | 16.58 | 3.087 | 10.673 | 30.34 | 20.291 | 150% |
| 1,2,3,4,7,8-HxCDD | 15.913 | 4.351 | 11.902 | 32.166 | 25.511 | 126% |
| 1,2,3,6,7,8-HxCDD | 20.11 | 10.639 | 25.255 | 56.004 | 35.492 | 158% |
| 1,2,3,7,8,9-HxCDD | 19.368 | 11.375 | 25.975 | 56.718 | 35.047 | 162% |
| 1,2,3,4,6,7,8-HpCDD | 348.546 | 476.195 | 858.069 | 1682.81 | 777.107 | 217% |
| OCDD | 14313.384 | 18325.278 | 34695.235 | 67333.897 | 33157.346 | 203% |
| TCDF | 48.95 | 325.231 | 870.818 | 1244.999 | 340.737 | 365% |
| PeCDF | 12.259 | 8.819 | 25.281 | 46.359 | 24.153 | 192% |
| PeCDF | 16.975 | 9.027 | 29.075 | 55.077 | 35.349 | 156% |
| HxCDF | 21.496 | 16.68 | 38.965 | 77.141 | 39.893 | 193% |
| 1,2,3,6,7,8-HxCDF | 15.114 | 6.262 | 16.67 | 38.046 | 23.981 | 159% |
| 1,2,3,7,8,9-HxCDF | 15.041 | 2.942 | 10.74 | 28.723 | 18.126 | 158% |
| 2,3,4,6,7,8-HxCDF | 18.432 | 4.113 | 13.988 | 36.533 | 25.524 | 143% |
| 1,2,3,4,6,7,8-HpCDF | 50.49 | 58.362 | 103.452 | 212.304 | 102.852 | 206% |
| 1,2,3,4,7,8,9-HpCDF | 14.091 | 7.02 | 18.144 | 39.255 | 20.784 | 189% |
| OCDF | 375.864 | 596.58 | 1165.733 | 2138.177 | 904.028 | 237% |

Total % Recovered: When compared to Sediment levels prior to experiment
Note that total would be 200% since 60 grams was used for the experiment compared to 30 grams used for sediment sample analysis prior to experiment.

Example 3—Heavy Metals Analysis

Sample Preparation Step 1:

A large section (44.6 grams) of a 20 mm basalt needlepunch mat was submerged in a 2N sodium hydroxide solution and soaked for 30 minutes while stirring. This procedure removed a coating from the sample (sizing). The divided into three tubes at volumes of approximately 50 ml each. The subsamples were added to two of the tubes and one tube was left as a control, labeled blank solution in the table above.

The closed three tubes were allowed to sit at room temperature for 24 hours. The three solutions were then analyzed in comparison with known ICP-MS standards. The purpose of this process was to observe the change in concentrations of the As, Cu, Pb and Hg elements from the solution due to the interaction with the baseline sample material (calculated as gain "+" or depletion "−"). The results are shown in Table VI.

TABLE VI

Results for the 24 Hour Soak of the Basalt Samples

| Parameter | Blank Solution After 24 Hours (µg/kg) | Sample Solution After 24 Hours (µg/kg) | Percent Change in Concentration (%) |
|---|---|---|---|
| As | 10.02 | 10.79 | +7.7% |
| Cu | 10.37 | 10.56 | +1.8% |
| Hg | 5.13 | 5.43 | +5.8% |
| Pb | 10.02 | 9.92 | −1.0% |

Sample Preparation Step 3:

For a more comprehensive understanding of the behavior of the basalt material in contact with the solution, a larger initial sample aliquot and longer interaction time were employed.

The remaining previously prepared sample was weighed to approximately 30 grams. A known solution of 10 µg/kg of each As, Cu, Pb and 5µg/kg Hg was prepared and divided into two beakers at volumes of approximately 250 ml each. The subsample was added to one of the beakers and the other beaker was left as a control, labeled blank solution in the Table V above.

The covered beakers were allowed to sit at room temperature for 96 hours. The three solutions were then analyzed in comparison with known ICP-MS standards. The purpose of this process was to observe the change in concentrations of the As, Cu, Pb and Hg elements from the solution due to the interaction with the baseline sample material (calculated as gain "+" or depletion "−"). The results are presented in Table VI, and it may be readily seen that arsenic and mercury were substantially removed; notice the percent change in the last column for each of these materials, −18.4% and −57.5%, respectively.

TABLE VII

Results for the 96 Hour Soak of the Basalt Sample

| Parameter | Blank Solution After 96 Hours (blg/kg) | Sample Solution After 96 Hours (blg/kg) | Percent Change in Concentration (%) |
|---|---|---|---|
| As | 11.63 | 9.49 | −18.4% |
| Cu | 14.06 | 71.70 | +410% |
| Hg | 6.23 | 2.65 | −57.5% |
| Pb | 9.53 | 18.04 | +89.3% |

Example 4—Heavy Metals Analysis

Sample Preparation Step 1:

A large section (111.2 grams) of the as-received needlepunch basalt mat (20 mm) was submerged in a 2N sodium hydroxide solution and soaked for 30 minutes while stirring. This procedure removed a coating from the sample (sizing). The sample was thoroughly rinsed in deionized water to remove any the excess sodium hydroxide. The sample was then dried overnight in a 105° C. forced air drying oven. This sample is considered the baseline.

The sized and dried sample was divided into six portions for the six analyses requested. Sample numbers were assigned to the stripped and dried portions as follows:

A: Sized/Dried/Bulk sample for polychlorinated biphenyls (PCBs) analysis=PCBs' baseline sample B: Sized/Dried/As-received/Bulk sample for semi-volatile organic compounds (SVOCs) analysis=SVOCs' baseline sample C: Sized/Dried/Bulk sample for metals analysis=Metals' baseline sample D: Leached solution for polychlorinated biphenyls (PCBs) analysis=PCBs' sample E: Leached solution for semi-volatile organic compounds (SVOCs) analysis=SVOCs' sample F: Leached solution for metals analysis=Metals' sample Three subsamples of Sample C were then digested in concentrated nitric acid in a 95° C. hot block for 2 hours. Due to the nature of the material, the sample did not completely digest and this analysis is considered a leaching procedure. The resulting leachate was diluted and analyzed in comparison with known ICP-MS standards. The results are presented in Tables VIII (ARO-CLOR PCBs), IX (bis (2-ethylhexyl)phthalate), and X (metals), below.

TABLE VIII

Results for PCBs Baseline - Sample A

| Analyte | Result (mg/kg) | Reporting Limit (mg/kg) |
|---|---|---|
| AROCLOR-1016 | ND | 0.93 |
| AROCLOR-1260 | ND | 0.93 |

TABLE IX

Results for bis(2-Ethylhexyl)phthalate SVOC Baseline - Sample B

| Analyte | Result (mg/kg) | Reporting Limit (mg/kg) |
|---|---|---|
| Bis (2-ethylhexyl) phthalate | ND | 2.5 |

TABLE X

Results for Metals Baseline - Sample C

| Analyte | Result (µg/kg) | Reporting Limit (µg/kg) |
|---|---|---|
| Chromium (Cr) | 1258 | 66 |
| Copper (Cu) | 1282 | 66 |
| Nickel (Ni) | 2200 | 197 |
| Zinc (Zn) | 2370 | 197 |
| Cadmium (Cd) | < LOO | 66 |
| Arsenic (As) | < LOO | 66 |
| Mercury (Hg) | < LOO | 66 |

Sample Preparation Step 2:

One liter leaching solutions were prepared to the following concentrations:

1 µg/L PCBs standards (AROCLOR-1016 and AROCLOR-1260)

100 µg/L SVOC (Bis (2-ethylhexyl) phthalate)

10 µg/L of each of the metals Cr, Cu, Ni, Zn, Cd, As and 7.5 µg/kg Hg

The sized and dried bulk sample was cut into three sections. Approximately 16 gram portions were used for the PCBs and SVOCs leach, and 50 grams were used for the metals analysis. The three portions were sub-merged in their respective leaching solutions. The solutions were covered and allowed to sit at room temperature for 24 hours.

The PCB's and SVOC's solutions were poured into amber bottles and submitted to the chemistry department as samples D and E.

The metals solution was then analyzed in comparison with known ICP-MS standards. A blank solution was also utilized.

The purpose of this process was to observe the change in concentrations of the analytes from the solution due to the interaction with the base-line sample material (calculated as gain "+" or depletion "−").

TABLE XI

Results for 24 Hours PCBs Soak of the Basalt Sample

| Parameter | Blank Solution (µg/L) | Sample Solution After 24 Hours (µg/L) | Percent Change in Concentration (%) |
|---|---|---|---|
| AROCLOR-1016 | 1 | 0.34 | −66% |
| AROCLOR-1260 | 1 | 0.20 | −80% |

TABLE XII

Results for 24 Hours SVOC Soak of the Basalt Sample

| Parameter | Blank Solution (µg/L) | Sample Solution After 39 Hours (µg/L) | Percent Change in Concentration (%) |
|---|---|---|---|
| Bis (2-ethylhexyl) phthalate | 100 | 39 | −61% |

TABLE XIII

Results for 24 Hours Metals Soak of the Basalt Sample

| Parameter | Blank Solution (µg/L) | Sample Solution After 24 Hours (µg/L) | Percent Change in Concentration (%) |
|---|---|---|---|
| Cr | 13.96 | 2.79 | −80% |
| Cu | 16.00 | 3.95 | −75% |
| Ni | 14.09 | 7.61 | −46% |
| Zn | 17.28 | 6.47 | −63% |
| Cd | 14.13 | 4.92 | −48% |
| As | 14.39 | 7.47 | −48% |
| Hg | 8.06 | 3.80 | −53% |

It may be seen from the results presented in Tables XI, XII, and XIII that basalt can remove PCBs, bis(2-ethylhexyl)phthalate, and metals, respectively from aqueous solutions.

Further, it will be appreciated that while the results presented in Table VII indicate an increase in concentration of copper and lead, it has been found that in other experiments that copper and lead have been removed.

Example 5—Heavy Metals Analysis

Sample Preparation Step 1:

The as-received needle punch basalt mats, ¼-inch thick (0.64 cm) and ½-inch thick (1.3 cm) were submerged in a 2N sodium hydroxide solution and soaked for 30 minutes while stirring. This procedure removed a coating from the sample (sizing). The samples were thoroughly rinsed in deionized water to remove any the excess sodium hydroxide. The sampled were then dried overnight in a 105° C. forced air drying oven. These samples were considered the baseline.

The sized and dried sample was divided into four portions for the four analyses requested. Sample numbers were assigned to the stripped and dried portions as follows:
  A and B: Sized/Dried/Bulk sample for metals analysis=Metals' baseline sample
  C and D: Leached solution for metals analysis=Metals' sample Two subsamples of Samples A/C and two subsamples of Samples B/D were then digested in concentrated nitric acid in a 95° C. hot block for 2 hours. Due to the nature of the material, the sample did not completely digest and this analysis is considered a leaching procedure. The resulting leachate was diluted and analyzed in comparison with known ICP-MS standards. The results for the Metals Baseline are presented in Tables XIV and XV, below.

TABLE XIV

Results for Metals Baseline - Sample A
¼-inch (0.64 cm) Basalt Needle Punch Mat

| Analyte | Result (µg/kg) | Reporting Limit (µg/kg) |
|---|---|---|
| Chromium (Cr) | 827.7 | 80 |
| Copper (Cu) | 331.1 | 80 |
| Nickel (Ni) | 7229 | 400 |
| Zinc (Zn) | 1694 | 80 |
| Cadmium (Cd) | <LOO | 80 |
| Arsenic (As) | <LOO | 80 |
| Mercury (Hg) | <LOO | 80 |
| Lead ( | <LOO | 80 |

TABLE XV

Results for Metals Baseline - Sample B
½-inch thick (1.3 cm) Basalt Needle Punch Mat

| Analyte | Result (µg/kg) | Reporting Limit (µg/kg) |
|---|---|---|
| Chromium (Cr) | 280.1 | 80 |
| Copper (Cu) | 299.5 | 80 |
| Nickel (Ni) | 450.6 | 80 |
| Zinc (Zn) | 1388 | 80 |
| Cadmium (Cd) | < LOO | 80 |
| Arsenic (As) | < LOO | 80 |
| Mercury (Hg) | < LOO | 80 |
| Led (Pb) | 138.2 | 80 |

Sample Preparation Step 2:

One liter leaching solutions were prepared to the following concentrations:
  10 µg/L of each of the metals Cr, Cu, Ni, Zn, Cd, As, Hg, and Pb The sized and dried bulk sample was cut into three sections. Approximately 6.7 grams of sample C were used for the metals. Approximately 20.5 grams of Sample D were used for the metals. The three portions were submerged in their respective leaching solutions. The solutions were covered and allowed to sit at room temperature for 24 hours.

The metals solution was then analyzed in comparison with known ICP-MS standards. A blank solution was also utilized.

The purpose of this process was to observe the change in concentrations of the analytes from the solution due to the interaction with the base-line sample material (calculated as gain "+" or depletion "−").

TABLE XVI

Results for 24 Hours Metals Soak of the Basalt Sample C
¼-inch (0.64 cm) Basalt Needle Punch Mat

| Parameter | Blank Solution (µg/L) | Sample Solution After 24 Hours (µg/L) | Percent Change in Concentration (%) |
|---|---|---|---|
| Cr | 8.52 | 2.59 | −70% |
| Cu | 13.96 | 8.67 | −38% |
| Ni | 9.18 | 10.85 | +18% |

TABLE XVI-continued

Results for 24 Hours Metals Soak of the Basalt Sample C
¼-inch (0.64 cm) Basalt Needle Punch Mat

| Parameter | Blank Solution (µg/L) | Sample Solution After 24 Hours (µg/L) | Percent Change in Concentration (%) |
|---|---|---|---|
| Zn | 19.16 | 21.08 | +10% |
| Cd | 8.83 | 8.51 | −3.6% |
| As | 8.35 | 0.69 | −92% |
| Hg | 8.78 | 8.79 | 0% |
| Pb | 11.87 | 1.19 | −90% |

TABLE XVII

Results for 24 Hours Metals Soak of the Basalt Sample C
½-inch thick (1.3 cm) Basalt Needle Punch Mat

| Parameter | Blank Solution (µg/L) | Sample Solution After 24 Hours (µg/L) | Percent Change in Concentration (%) |
|---|---|---|---|
| Cr | 8.52 | 2.75 | −68% |
| Cu | 13.96 | 1.91 | −86% |
| Ni | 9.18 | 5.94 | −35% |
| Zn | 19.16 | 6.61 | −66% |
| Cd | 8.83 | 3.29 | −63% |
| As | 8.35 | 7.66 | −8.3% |
| Hg | 8.78 | 8.73 | −0.5% |
| Pb | 11.87 | 1.19 | −91% |

Thus, Tables XVI and XVII demonstrate a 90% and 91% lead absorption by basalt.

In the foregoing specification, the invention has been described with reference to specific embodiments thereof, and has been described as effective in providing methods for removing toxic materials from substances such as sediments. However, it will be evident that various modifications and changes can be made thereto without departing from the broader scope of the invention as set forth in the appended claims. Accordingly, the specification is to be regarded in an illustrative rather than a restrictive sense. For example, specific fluids, substances, sediments, toxic materials, basalt forms, proportions, contact times, contact methods, etc. falling within the claimed parameters, but not specifically identified or tried in a particular process, are expected to be within the scope of this invention. Additionally, the methods described herein may be expected to remove toxic material from any substance that also comprises or consists of water and at least one toxic material.

The present invention may suitably comprise, consist or consist essentially of the elements disclosed and may be practiced in the absence of a disclosed element or in the absence of an element not disclosed. For in-stance, there may be provided a method of removing toxic material from a substance, e.g. sediment, that consists essentially of or consists of contacting sediment comprising, consisting essentially of or consisting of water and at least one toxic material with an effective amount of basalt for a period of time effective to remove at least a portion of the at least one toxic material from the sediment by adsorption, including, but not necessarily limited to, the at least one toxic materials, the periods of time, and the amounts set forth in the claims.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the dis-closure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the dis-closure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for adsorbing toxic materials, the method comprising:
    exposing a fluid to a filter for a first minimum duration, wherein the fluid comprises water and a toxic material comprising at least one of a dioxin, a furan, a polychlorinated biphenyl (PCB), or an ethylhexylphthalate, and wherein the filter comprises a needlepunch mat consisting of basalt fibers and having a thickness selected from about 6.5 mm, about 13 mm, or about 20 mm; and
    enabling at least a portion of the toxic material to be adsorbed by the basalt fibers.

2. The method of claim 1, further comprising:
    exposing the needlepunch mat to a 10% NaOH solution before exposing the fluid to the filter.

3. The method of claim 2, wherein exposing the needlepunch mat to the 10% NaOH solution further comprises:
    exposing the needlepunch mat to the 10% NaOH solution under agitation.

4. The method of claim 2, further comprising:
    rinsing the needlepunch mat in deionized water to remove the 10% NaOH solution after exposing the needlepunch mat to the 10% NaOH solution.

5. The method of claim 4, further comprising:
    after rinsing the needlepunch mat, drying the needlepunch mat.

6. The method of claim 5, wherein drying the needlepunch mat further comprises:
    drying the needlepunch mat using forced air.

7. The method of claim 1, wherein the toxic material comprises a sediment.

8. The method of claim 1, wherein the toxic material further comprises at least one of arsenic, mercury, chromium, copper, nickel, zinc, cadmium, or lead.

9. The method of claim 1, wherein exposing the fluid to the filter further comprises at least one of:
spraying the needlepunch mat with the fluid; or
immersing the needlepunch mat in the fluid.

10. The method of claim 1, wherein enabling at least a portion of the toxic material to be adsorbed by the basalt fibers further comprises:
enabling a weight-to-weight ratio of the needlepunch mat to the toxic material adsorbed of 200:1 to 1:3.

11. The method of claim 1, wherein the first minimum duration is from about three days to about seven days.

12. The method of claim 1, wherein enabling at least a portion of the toxic material to be adsorbed by the basalt fibers further comprises:
enabling at least 25% by weight of the toxic material in the fluid to be adsorbed.

13. The method of claim 1, wherein enabling at least a portion of the toxic material to be adsorbed by the basalt fibers further comprises:
enabling the basalt fibers to selectively adsorb the toxic material in the presence of a water-soluble material.

14. The method of claim 1, wherein the ethylhexylphthalate is bis (2-ethylhexyl) phthalate.

15. A method for adsorbing toxic materials, the method comprising:
exposing a fluid mixture comprising an aqueous sediment to a filter comprising a needlepunch mat consisting of basalt fibers, wherein the fluid mixture comprises a toxic material including at least one of a dioxin, a furan, a polychlorinated biphenyl (PCB), or an ethylhexylphthalate, and wherein the fluid mixture is chemically exposed to the basalt fibers; and
enabling at least a portion of the toxic material to be adsorbed by the basalt fibers, including exposing the fluid mixture to the basalt fibers for a first minimum duration, wherein the needlepunch mat has a thickness selected from about 6.5 mm, about 13 mm, or about 20 mm.

16. The method of claim 15, comprising:
exposing the basalt fibers to a 10% NaOH solution before exposing the fluid mixture to the filter.

17. The method of claim 16, wherein exposing the basalt fibers to the 10% NaOH solution further comprises:
exposing the basalt fibers to the 10% NaOH solution under agitation.

18. The method of claim 16, further comprising:
after exposing the basalt fibers to the 10% NaOH solution, rinsing the needlepunch mat in deionized water to remove the 10% NaOH solution from the basalt fibers.

19. The method of claim 18, further comprising:
after rinsing the needlepunch mat, drying the needlepunch mat.

20. The method of claim 19, wherein drying the needlepunch mat further comprises:
drying the needlepunch mat using forced air.

21. The method of claim 15, wherein the toxic material further comprises at least one of arsenic, mercury, chromium, copper, nickel, zinc, cadmium, or lead.

22. The method of claim 15, wherein exposing the the fluid mixture to the filter further comprises at least one of:
spraying the needlepunch mat with the fluid mixture; or
immersing the needlepunch mat in the fluid.

23. The method of claim 15, wherein enabling at least a portion of the toxic material to be adsorbed by the basalt fibers further comprises:
enabling a weight-to-weight ratio of the basalt fibers to the toxic material adsorbed of 200:1 to 1:3.

24. The method of claim 15, wherein the first minimum duration is from about 24 hours to about 7 days.

25. The method of claim 15, wherein enabling at least a portion of the toxic material to be adsorbed by the basalt fibers further comprises:
enabling at least 25% by weight of the toxic material in the fluid mixture to be adsorbed.

26. The method of claim 15, wherein the fluid mixture further comprises a water-soluble material and the basalt fibers selectively adsorb the toxic material in presence of the water-soluble material.

27. The method of claim 15, wherein the ethylhexylphthalate is bis (2-ethylhexyl) phthalate.

28. A method for adsorbing toxic materials, the method comprising:
exposing an aqueous fluid to a filter, wherein the aqueous fluid comprises a toxic material including at least one of arsenic, mercury, chromium, copper, nickel, zinc, cadmium, or lead;
wherein the filter comprises a needlepunch mat consisting of basalt fibers and having a thickness selected from about 6.5 mm, about 13 mm, or about 20 mm; and
after exposing the aqueous fluid to the filter, adsorbing at least a portion of the toxic material by the basalt fibers.

* * * * *